Dec. 9, 1941.  R. C. ALLEN  2,265,592

TURBINE BLADE

Filed Jan. 16, 1939

Inventor
R. C. Allen
by
Attorney

Patented Dec. 9, 1941

2,265,592

UNITED STATES PATENT OFFICE 2,265,592

TURBINE BLADE

Robert C. Allen, Wauwatosa, Wis., assignor to Allis-Chalmers Manufacturing Company, Milwaukee, Wis., a corporation of Delaware Application January 16, 1939, Serial No. 251,052

4 Claims. (Cl. 253—77)

This invention relates generally to turbine blades and more particularly to the construction of blades for high pressure turbines.

The operation of elastic fluid turbines at increasingly higher pressures has resulted in frequent blade failures, particular reference being had to the failure of the impulse blading in superimposed or top turbines. These failures which occur after a relatively short period of turbine operation occasionally cause serious damage to other parts of the turbine and always necessitate extensive repairs and a considerable loss of time and money. Moreover, the new blades substituted for those which failed have also failed after only a short period of operation and this fact has in some instances necessitated a complete rebuilding of the blading in an attempt to eliminate these failures. Numerous attempts have also been made to eliminate such failures by developing and using new and improved blade materials and new and improved blade holding and mounting structures, but these attempts have not been uniformly successful in solving the problem as the previously mentioned failures have occurred in turbines embodying the latest known features of construction and design.

Extensive research has resulted in the discovery that the failure of the moving blades in high pressure turbines, which has occurred after a relatively short period of operation and which generally results in a fracture of the blade adjacent its base or root, is in many instances caused by forced blade vibration rather than by defective materials and improperly designed mounting structures, and that the destructive vibration occurs during operation at normal or full speed due to the fact that under these conditions there is some looseness between the blade root and the spindle groove and as each blade passes through a fluid admission zone or arc it receives an instantaneous load application or blow which causes a slight and rapidly repeated tilting of the blade root within the spindle groove.

Further investigation has established the fact that the looseness between the blade root and the spindle groove, which permits the blade to be tilted, is present during operation at normal or full speed irrespective of the fact that the blade root may be tight in the spindle groove when the spindle is at rest. This looseness is due to the fact that the blade and spindle materials have some elasticity and that when the spindle is rotating, centrifugal force produces an elastic stretch of the blade root and of the walls of the spindle groove. Moreover, additional looseness between the blade root and the spindle groove is caused by the slow deformation or creep of the blade and spindle materials which results from continuous operation at elevated temperatures. The sudden application of load which causes a rapid tilting or vibration of a loose blade is present in all partial admission elements and is especially noticeable with respect to the impulse blading in high pressure turbines. In such turbines, the fluid is admitted through circumferentially spaced nozzles or groups of nozzles constituting spaced zones or arcs of fluid admission and therefore each blade receives an impact and is caused to tilt and to return to its original position with respect to the spindle groove, which movement constitutes a vibration, each time it passes into and out of an arc of fluid admission. Consequently, a turbine operating at 3600 R. P. M. and having only a single nozzle group will cause each blade to vibrate 60 times a second.

The destructive blade vibration hereinabove mentioned is, in accordance with this invention, entirely eliminated irrespective of the turbine speed, the particular blade and spindle materials used and the mounting structure employed by the use of blades so constructed with reference to the interrelation between the effective area, weight and shape of each blade, the effective pressure of the operating fluid, the spindle diameter and the turbine speed that the sudden application of load as produced by the operating fluid will not effect a tilting of the blades within the spindle grooves. This interrelation, termed the centrifugal stability factor, which is necessary to produce the desired result and which is best expressed as the ratio of the moment produced by the centrifugal force (acting in opposition to the moment produced by the working fluid) to the moment produced by the working fluid, should be equal to or greater than the quotient obtained by dividing the maximum blade deflection by the equilibrium or static blade deflection.

Therefore, the primary object of this invention is to provide an improved and novel turbine blade construction which will entirely eliminate the previously described destructive vibration.

A further object is to provide an improved and novel turbine blade in which the centrifugal stability factor is equal to or greater than the quotient obtained by dividing the maximum blade deflection by the equilibrium or static blade deflection.

The invention accordingly consists of the interrelation between the various factors determining the size, weight, and shape of a turbine blade in combination with other related features as more fully pointed out in the appended claims and in the detailed description, in which:

Figure 1:
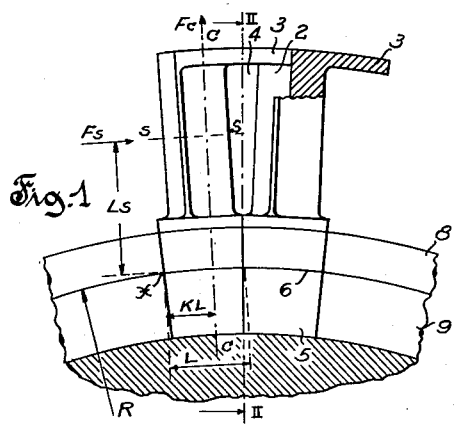
Fig. 1 is a side elevational view partly in section, illustrating the coactive relationship between two impulse blades mounted in a turbine spindle in a conventional manner.
Figure 2:
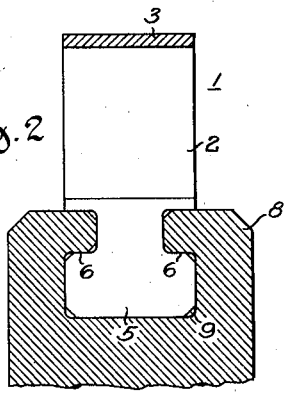
Fig. 2 is a vertical sectional view taken on the line II—II of Fig. 1 and illustrates the coactive relationship between the blade root and the spindle groove.

The invention, reference being had to Figs. 1 and 2, is illustrated in connection with a conventional type of impulse blade 1 comprising an active or fluid engaging surface 2, a rearwardly extending projection 3 which coacts with the opposed surface of an adjacent blade to form therewith the usual passage 4 for the operating fluid and a root or base portion 5 having the retaining surfaces 6. The turbine spindle 8 contains a circumferentially extending groove 9, the cross sectional configuration of which conforms with the shape of the blade root 5 as shown in Fig. 2. The blade root 5 is inserted in the groove 9 which, with the aid of the coacting surfaces of the adjacent blade as shown in Fig. 1, securely holds the blade 1 against radial and lateral movement. The manner of inserting the blades in the spindle groove 9 is not shown as it forms no part of this invention and in this connection it should be understood that the invention is applicable to blades generally, irrespective of the particular shape of the blade and its root portion and that only those blade features, which are deemed essential for a complete understanding of the invention, are illustrated and described.

The dot and dash line $c$—$c$ designates the radial line of action of the centrifugal force of a single blade which force is expressed in pounds and is designated $Fc$. $L$ designates the circumferential dimension of the retaining surfaces 6 of the blade root 5 at a radius $R$ expressed in inches. $K$ designates the proportion of the length of the retaining surfaces $L$ from the point $X$ at which the radial line of action $c$—$c$ of the centrifugal force $Fc$ intersects the spindle cylinder of radius $R$ which cylinder ontains the groove retaining surfaces engaged by the surfaces 6 of the blade root 5. The line of action of the effective fluid force is designated $s$—$s$ and the maximum fluid force exerted on the blade in pounds is designated $Fs$. $Ls$ designates the distance of the center of pressure of the fluid driving force $Fs$ from the retaining surfaces of the root 5 at point $X$.

Figure 3:
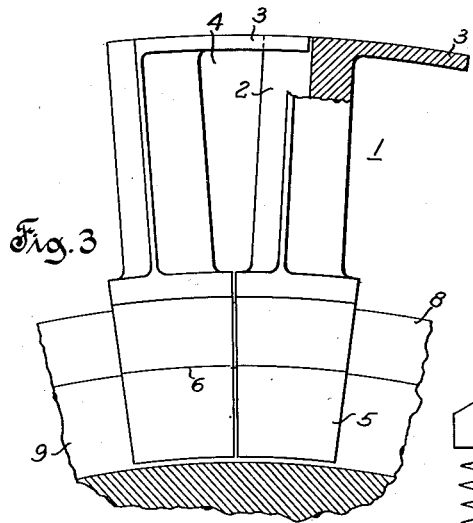
Figs. 3 and 4 are respectively similar to Figs. 1 and 2 and illustrate on an enlarged scale the looseness produced by elastic stretch or creep.
Figure 4:
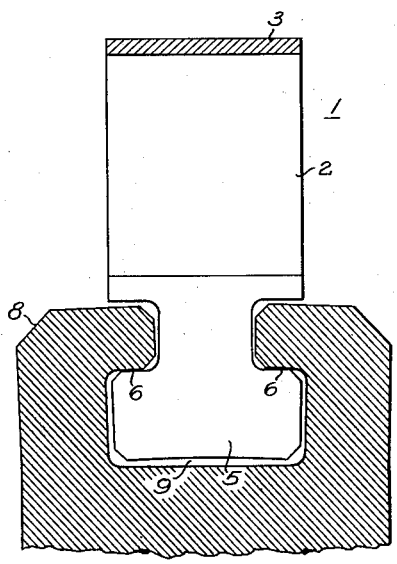

Rotation of the spindle 8 at its normal or full speed produces an elastic stretch of the blade and spindle materials as hereinbefore mentioned and changes the relationship between the coacting surfaces of adjacent blades and between the coacting surfaces of the blade root 5 and the spindle groove 9 from that shown in Figs. 1 and 2 representing static conditions to that shown in Figs. 3 and 4 representing dynamic conditions on an enlarged scale. Consequently, normal or full speed operation renders the coacting surfaces of adjacent blades and of the blade root 5 and the spindle groove 9 ineffective to prevent the blade from chattering or vibrating within the spindle groove 9 in the manner previously pointed out. In other words, elastic stretch or the effect of creep produces sufficient looseness between adjacent blades and between the circumferentially coacting surfaces of the blades and spindle groove to permit the blades to be tilted in the spindle groove by a rapid or sudden application of the operating fluid.

With a continuous or uniform application of the steam driving force on the blade, the blade will be in equilibrium. The moment tending to tilt the blade in the clockwise direction about the point $X$ is $FsLs$. With the turbine running at full speed and with a uniform application of the fluid driving force, the forces imposed on the blade to resist the moment set up by the fluid driving force may vary considerably, depending on the design proportions of the blade.

For example, tilting of the blade under the influence of the fluid driving force $Fs$ may be prevented in part by the opposite moment set up by the centrifugal force $Fc$ and in part by a reaction of the coacting surfaces of adjacent blades and of the spindle groove 9. With a uniform application of the fluid driving force, this method of holding the blade would be satisfactory. If, however, the blade is used in a partial admission wheel in which the driving force is applied and removed at least once per revolution, the equilibrium must be established entirely by the effect of centrifugal force.

This is necessary as the effect of elastic stretch and creep of the blade and spindle material produces some looseness between adjacent blades and between the root members and the grooves which substantially eliminates the resistance produced by the coacting surfaces. Consequently, under these conditions, stability is produced only when the centrifugal moment $FcKl$ is greater than $FsLs$.

Figure 5:
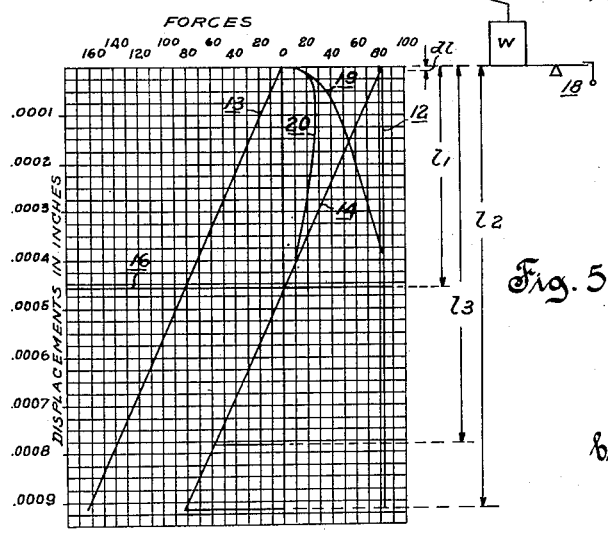
Fig. 5 shows an undamped spring supported system and comparative force deflection curves illustrating the actual difference in the deflection produced by a rapid and by an instantaneous application of load.

Partial admission of fluid to a turbine element subjects the blades to a rapidly repeated application of load as previously pointed out and since blade structures are designed to be rigidly held in the spindle groove, the only damping present is that of internal friction in the blade material or due to a slight sliding between contacting surfaces, which damping may be entirely neglected for practical design purposes. Therefore, the stress set up in a blade under partial admission conditions may be approximately determined by an analysis of an equivalent mechanical arrangement, an undamped spring supported system which is instantaneously loaded by a weight $W$. Fig. 5 schematically illustrates such a system designated generally by numeral 10 and characteristic curves of which curve 12 represents the instantaneously applied driving force or weight $W$, curve 13 the elastic resisting or spring force set up in the blade or spring by a given deflection, curve 14 the accelerating force which at any instant is equal to the difference between the weight or driving force (curve 12) and the resisting force (curve 13), and 16 the equilibrium or static deflection line. The term, "equilibrium or static deflection," is herein considered to be the deflection produced by an application of load, the weight $W$ in the system illustrated in Fig. 5, or the force of the driving fluid in a turbine, which is so gradually applied that the system is not caused to oscillate, or stated differently, if the application of the load does cause the system to oscillate, the constant deflection maintained by the applied load after the oscillation of the system is terminated. The spring 17 is under no tension in the position shown as the weight W is entirely supported by a readily releasable means 18.

The first increment of travel of the system produced by suddenly releasing the weight W which constitutes an instantaneous application of load, is $dl$, the accelerating force is W and the energy applied in accelerating the system is $Wdl$. In such a system, the difference between $Pl$, the opposing spring force represented by curve 13, where P equals the scale of the spring in pounds per inch and $l$ the deflection in inches, and the applied weight or force W, represented by curve 12, which difference, $W-Pl$, is represented by curve 14, and becomes less and less until at the equilibrium or static deflection position $l_1$ (the actual deflection of the system produced by the gradual application of the weight W) the accelerating force is zero and the work done in producing the deflection $l_1$ is equal to the kinetic energy stored in the system. Stated in equation form, the kinetic energy $$E = \int_0^{l_1} (W - Pl) dl$$

Integrating between the limits 0 and $l_1$ establishes that $$E = Wl_1 - \frac{(Pl_1)^2}{2} = l_1 \frac{(2W - Pl_1)}{2}$$

and since W equals $Pl_1$, $$E = \frac{Wl_1}{2}$$

which in Fig. 4 is represented by that area lying above the static deflection line 16 and bounded by the zero force ordinate, the abscissa representing zero deflection and curve 14. The conversion of the stored energy represented by the above identified area into strain energy is in turn represented by that area lying beneath the static deflection line 16 and bounded by the zero force ordinate, the abscissa representing maximum deflection and curve 14.

It is therefore obvious that the sudden application of a load will cause the system to overtravel due to the energy stored in the spring a distance equal to $l_1$ in order to convert the kinetic energy into strain energy and that the deflection and the stress in the spring at the point of maximum extension $l_2$ is twice the deflection and stress at the equilibrium or static deflection position $l_1$. Consequently an instantaneously applied load on a turbine blade will produce twice the stress and deflection (bending of a rigidly held blade) as would be produced if the same force were gradually applied, and having the knowledge that elastic stretch or creep produces sufficient looseness between the blade root and the coacting surfaces of the spindle groove to permit destructive chattering or vibration of the blade root within the spindle groove, it is obvious that the centrifugal stabilizing moment FcKL should be equal to or greater than twice the steam bending moment FsLs. In other words, the centrifugal stability factor which is the ratio of the centrifugal stabilizing moment FcKL divided by the steam bending moment FsLs should be equal to or greater than the quotient obtained by dividing the maximum deflection $l_2$ by the equilibrium or static deflection $l_1$.

The results obtained by the foregoing elementary analysis, although entirely satisfactory for practical design purposes are not entirely correct due to the fact that in actual practice the driving force is not instantaneously applied. For example, a modern high pressure high temperature top turbine, which operates at the conventional speed of 3600 R. P. M. employs approximately 100 blades in the first impulse row and with properly designed nozzle and blade passages the driving force will start at zero as the blade moves into the fluid admission arc and will increase from zero to maximum value during the time interval required for the spindle to rotate an angular distance equal to the blade pitch at the mean diameter. It is therefore obvious that the load on each blade will increase from zero to the maximum value in $\frac{1}{60}$ of a second divided by 100 or $\frac{1}{6000}$ of a second. The relatively short time interval required for the load to reach its maximum value will slightly modify the minimum value for the centrifugal stability factor obtained by the aforementioned analysis. Consequently, if the actual value of the centrifugal stability factor is desired for design purposes, it will be necessary to include the time element in the calculations.

The quantity of fluid flowing through a blade passage increases in direct proportion to the linear travel of the blade, and it is therefore obvious that at a uniform rate of speed the fluid driving force will increase from zero to its maximum value directly as the time. The rate of increase expressed as a derivative, $$\frac{dFs}{dt}$$

is constant where $t$ represents time, i. e., $$\frac{dFs}{dt} = K_1$$

The blades enter the arc of fluid admission in a normal radial position and as the driving force is applied, each blade deflects from its initial or unloaded position an amount proportional to the driving force. Consequently, an elastic resisting force Fb is set up in each blade which is proportional to the deflection and which corresponds to the ordinary performance of a spring where the ratio of force to deflection is constant. Expressed as a derivative, $$\frac{dFb}{dy}$$

is constant where $y$ equals the deflection, i. e., $$\frac{dFb}{dy} = K_2$$

At any time $t$, after a given blade starts to enter the active arc of admission the driving force will increase to some partial value, which may be expressed as $$\frac{t(dFs)}{dt}$$

and the blade will have deflected a proportional amount thereby, establishing a proportional elastic resisting force equal to $$\frac{y(dFb)}{dy}$$

Acceleration, $$A = \frac{f}{M}$$

where $f$ represents the force and $M$ the mass and since $$K_1 = \frac{dFs}{dt}$$

and $$K_2 = \frac{dFb}{dy}$$

the acceleration at the end of time $t$ can be expressed as $$A = \frac{K_1 t - K_2 y}{M}$$

However, acceleration is also equal to $$\frac{d^2 y}{dt^2}$$

and by equating these two expressions for acceleration at the end of time $t$ the following differential equation is obtained:

$$\frac{d^2 y}{dt^2} + \frac{K_2 y}{M} = \frac{K_1 t}{M}$$

The procedure for solving this first order, non-homogeneous linear differential equation, is given on pages 210–211 of the book, "Manual of Mathematics and Mechanics," by Clements and Wilson, published in 1937 by the McGraw-Hill Book Company, and its general solution, $$y = C_1 \sin\left(\frac{K_2}{M}\right)^{\frac{1}{2}} t + C_2 \cos\left(\frac{K_2}{M}\right)^{\frac{1}{2}} t + \frac{K_1 t}{K_2}$$

makes possible the calculation of the actual forces imposed on the blade in any given problem in which it is desired to take into account the time required for unloaded blades to attain their maximum load.

A practical construction for a turbine in which the driving force at one-quarter load reaches its maximum value of 81 pounds in 1/6000 of a second is a blade having a mean length of 2.344 inches and a weight of 0.236 pound. Assuming that the modulus of elasticity of the blade material used is 29,000,000 pounds per square inch and solving the previously derived equation, it is found that the static or equilibrium deflection of the blade, which is represented by line 16 of Fig. 5, is 0.000457 inch. The equation can now be solved to determine the actual deflection of the blade at any instant and the corresponding driving force or blade load, and with this data, curve 19 of Fig. 5, representing the rapidly applied driving force which increases from zero to the maximum value of 81 pounds in 1/6000 of a second, can be readily plotted. Curve 20 of Fig. 5, which represents the accelerating force produced at any instant by the rapidly applied driving force is obtained by subtracting curve 13 from curve 19. It should be noted that, in the analysis of the undamped spring supported system schematically illustrated in Fig. 5, the instantaneously applied load W is equal to the maximum driving force, and the spring scale is a function of the modulus of elasticity of the blade material and the dimensions of the blade, and that therefore curves 12, 13 and 14 and line 16 of Fig. 5 correctly represent the effect of an instantaneous application of a driving force of 81 pounds to the turbine blade in question when rigidly held in the turbine spindle.

The area lying above the static deflection line 16, which area is bounded by the zero force ordinate and curve 20, represents to some scale, as previously explained in connection with the analysis of an undamped spring supported system, the energy stored in the blade which is available for bending the blade beyond the static deflection point. The conversion of this stored energy into strain energy is represented by an area lying beneath the equilibrium or static deflection line and bounded by the zero force ordinate, and curve 14, which area is equal to the area lying above the static deflection line and bounded by the zero force ordinate and curve 20. The abscissa which also bounds this area determines the maximum deflection produced by a rapidly applied load, which in the selected example, is 0.000779 inch. A comparison of the maximum deflections $l_2$ and $l_3$ obtained by the previously described analysis establishes that where the driving force is rapidly applied, i. e., increases from zero to the maximum value in 1/6000 of a second, the blade will overtravel the equilibrium deflection point by 69.9%. Therefore, the application of the complete analysis to the particular problem under consideration results in reducing the value of the centrifugal stability factor from 2 to 1.7 which amounts to an actual reduction of only 15%. The previously described complete analysis is applicable in all cases and will always effect a slight reduction in the value of the centrifugal stability factor as determined by an analysis based on an assumption that the driving force is instantaneously applied.

The features of primary importance are the facts that dynamic equilibrium is realized only when the centrifugal stability factor $$\frac{FcKL}{FsLs}$$

is equal to the quotient obtained by dividing the maximum blade deflection by the static blade deflection, and that in order to obtain dynamic stability the centrifugal stability factor must be greater than said quotient, i. e., $$\frac{FcKL}{FsLs}$$

is greater than $$\frac{l_2}{l_1}$$

However, in order to include a reasonable factor of safety, the ratio of $FcKL$ to $FsLs$ should be equal to or greater than 3. The centrifugal stability factor determines the interrelation between the size, weight and shape of the turbine blade, the pressure of the operating fluid, the spindle diameter and the turbine speed which is necessary in order to eliminate the destructive chattering or vibration hereinbefore mentioned and it should be obvious that when the construction of the blading is such that the stability factor is greater than the ratio $$\frac{l_2}{l_1}$$

the centrifugal stabilizing moment $FcKL$ will always maintain the retaining surfaces 6 of the blade root 5 tightly engaged with the cooperating surfaces of the spindle groove 9. Stated differently, a turbine embodying the invention includes blades having physical characteristics, namely, the size, weight and shape of the blade, so correlated with respect to the turbine speed and with respect to the pressure of the driving fluid that during normal operation the centrifugal moment acting on a blade in opposition to the bending moment produced by the action of the driving fluid is always operable irrespective of the degree of looseness between the coacting blade and spindle retaining portions to prevent the action of the driving fluid from effecting a tilting movement of the blade.

The invention is obviously applicable to all types and forms of turbine blading and turbine blading holding and mounting means, and although it is of particular importance in connection with the construction of high pressure impulse blading, it should be understood that it is not desired to limit the invention to the particular features of construction herein shown and described, as various modifications within the scope of the appended claims may occur to persons skilled in the art.

It is claimed and desired to secure by Letters Patent:

1. A turbine comprising a rotor, driving fluid admission means adapted to subject blades carried by said rotor to sudden repeated applications of impact, and blades secured to said rotor by means including coacting rotor and blade parts providing retaining surfaces some of which limit the outward radial movement of the blades with respect to the rotor in the event there is some degree of looseness between said coacting parts wherein said blades have physical characteristics comprising size, weight and shape so correlated with respect to the turbine speed and with respect to the pressure of the driving fluid that during normal operation centrifugal force acts on a blade to retain said limiting surfaces in abutting relation and produces a moment which acts in opposition to the moment produced by the impact action of the driving fluid on the working face of the blade and which is of sufficient magnitude to hold said limiting surfaces in abutting relation with sufficient force to prevent said fluid produced moment from tilting said blade relative to said rotor.

2. A partial admission turbine comprising a rotor and blades secured to said rotor by means including coacting rotor and blade parts shaped to provide abutting retaining surfaces some of which limit the outward radial movement of the blades with respect to said rotor in the event there is some degree of looseness between said coacting parts wherein said blades have physical characteristics comprising size, weight and shape so correlated with respect to the turbine speed and with respect to the pressure of the driving fluid that during normal operation centrifugal force acting on a blade produces a moment which acts in opposition to the moment produced by the driving fluid effecting a sudden application of impact to the working face of the blade and which is of sufficient magnitude to be operative irrespective of the degree of looseness between said coacting parts to hold said limiting surfaces in abutting relation with sufficient force to prevent said fluid produced moment from tilting said blade relative to said rotor.

3. A turbine comprising a rotor, driving fluid admission means adapted to subject blades carried by said rotor to sudden repeated applications of impact, and blades rigidly secured to said rotor by means including coacting rotor and blade parts between which looseness may develop due to elastic stretch and creep of the rotor and blade materials wherein said blades have physical characteristics comprising size, weight and shape so correlated with respect to the turbine speed and with respect to the pressure of the driving fluid that during normal operation centrifugal force acts on a blade to maintain those of said coacting parts which limit the outward radial movement of the blade firmly engaged and produces a moment which acts in opposition to the moment produced by the impact action of the driving fluid on the working face of the blade and which is of sufficient magnitude to be operative irrespective of the degree of looseness between said coacting parts to hold said radial movement limiting parts firmly engaged with sufficient force to prevent said fluid produced moment from tilting said blade relative to said rotor.

4. A partial admission turbine comprising a rotor and blades having root portions secured to said rotor by means including coacting rotor and blade root parts shaped to provide abutting retaining surfaces some of which limit the outward radial movement of the blades with respect to the rotor in the event there is some degree of looseness between said coacting parts wherein said blades have physical characteristics comprising size, weight and shape so correlated with respect to the turbine speed and with respect to the pressure of the driving fluid that during normal operation the centrifugal stabilizing moment acting on a blade to maintain said limiting surfaces in abutting relation is equal to or greater than the product of the maximum and oppositely acting moment to which the blade is subjected by the driving fluid effecting a sudden application of impact to the working face of the blade and the quotient obtained by dividing the maximum blade deflection produced by the driving fluid effecting a sudden application of impact to the working face of a blade having its root portion rigidly secured to said rotor, by the equilibrium or static blade deflection produced by a continuous application of the driving fluid to the working face of said rigidly secured blade.

ROBERT C. ALLEN.